(12) United States Patent
Hanson et al.

(10) Patent No.: US 6,296,205 B1
(45) Date of Patent: Oct. 2, 2001

(54) RF INSPECTION SATELLITE

(75) Inventors: John E. Hanson, Mountain View; Raymond G. Zenick, Jr., Solana Beach, both of CA (US); Richard D. Fleeter, Reston, VA (US)

(73) Assignee: Aeroastro, Inc., Herndon, VA (US)

( * ) Notice: Subject to any disclaimer, the term of this patent is extended or adjusted under 35 U.S.C. 154(b) by 0 days.

(21) Appl. No.: 09/267,942

(22) Filed: Mar. 11, 1999

(51) Int. Cl.⁷ .................................................. B64G 1/10
(52) U.S. Cl. ............................................. 244/158 R
(58) Field of Search ........................ 244/158 R, 161, 244/164, 169, 172

(56) References Cited

U.S. PATENT DOCUMENTS 4,298,178 * 11/1981 Hujsak .............................. 244/158 R
4,667,908 * 5/1987 Hayden et al. ............... 244/158 R X
4,880,187 * 11/1989 Rourke et al. ...................... 244/172
6,017,000 * 1/2000 Scott .............................. 244/164 X

* cited by examiner

*Primary Examiner*—Robert P. Swiatek
(74) *Attorney, Agent, or Firm*—Robert M. McDermott, Esq.

(57) ABSTRACT

An inspection satellite is deployed in proximity to another satellite. The inspection satellite contains monitoring equipment and provides diagnostic information to a earth station to facilitate diagnosis of the other satellite and its equipment. The inspection satellite includes a flight control system that maintains the probe satellite in proximity to the satellite being monitored. In a preferred embodiment, the flight control system can also maintain the inspection satellite in an orbit about the satellite being monitored, to facilitate diagnostics based on patterns of signals. The monitoring equipment in a preferred embodiment for a transponder satellite includes an ability to monitor incoming signals and to compare the emissions from the satellite to them, to determine performance characteristics of the satellite equipment being monitored, such as phase shift and gain.

25 Claims, 3 Drawing Sheets

Target Satellite

Operator Terminal

RF INSPECTION SATELLITE

BACKGROUND OF THE INVENTION

1. Field of the Invention

This invention relates to the field of satellites, and in particular to the field of satellite maintenance and diagnosis.

2. Description of Related Art

The information age produces a continuing demand for communications. Satellite systems are often the system of choice for communications, because of their wide range and virtually unobstructed field of view of large areas of the earth. Satellites are also used for gathering information that is difficult or impossible to obtain from earth based stations.

Due to the high cost of launching and deploying a satellite, communications and information gathering satellites are typically designed as high capacity or multi-function systems, to defray the cost among multiple users or multiple applications. Also because of the high cost of replacing a satellite, most satellites are designed to be highly reliable and highly robust. Programmable on-board systems are utilized to allow for changes of function or configuration in the event of a fault; redundant components and capabilities are also often provided.

A necessary adjunct to systems that can be remotely repaired or reconfigured is a means for diagnosing the system to determine whether a repair or reconfiguration is warranted, and the particular actions necessary to effect the repair or reconfiguration. In a typical satellite system, the satellite contains signal and status monitoring equipment, and processing capabilities to provide diagnostic information to a ground station based on the monitored signals and status information. A problem with an onboard monitoring system, however, is the fact that it is on board. Although most onboard systems are designed to be independent of the mission-oriented systems that they are intended to monitor, the cost of providing an additional completely independent system from the mission-oriented system makes such an approach impractical. Other problems are also inherent to the onboard location of the diagnostic system. The proximity of the monitoring equipment to the equipment being monitored, and other equipment on board, makes it susceptible to electromagnetic interference or parasitic effects that may limit or obscure the available diagnostic information. The on board location also places the monitoring equipment "behind" the antennas used by the mission-oriented system to communicate with earth based equipment, and thus any problems related to the antenna systems cannot be monitored. This deficiency is particularly problematic for transmission systems, because the higher power devices used at the final transmission stages typically have a significantly higher failure rate than low power devices. Measurements of a satellite's antenna and transmission system are typically obtained by earth-based diagnostic systems. The accuracy, resolution, and other capabilities of an earth based system are limited, however, because of the signal degradation and interference associated with the hundreds or thousands of miles separating the earth-based systems and the satellite.

BRIEF SUMMARY OF THE INVENTION

It is an object of this invention to provide an independent means for diagnostic monitoring of a satellite and its equipment. It is a further object of this invention to provide a means for monitoring emissions from a satellite's antenna systems to facilitate diagnosis of the associated transmission equipment and components. It is a further object of this invention to provide a means for diagnostic monitoring of a satellite and its equipment that has minimal susceptibility to the electromagnetic interference and parasitic effects associated with the satellite equipment. It is a further object of this invention to provide a means for diagnostic monitoring of a satellite and its equipment that is not affected by the satellite to earth signal path losses.

These objects and others are achieved by deploying a probe satellite in proximity to the satellite being monitored. The probe satellite contains monitoring equipment and provides diagnostic information to an earth station to facilitate diagnosis of the satellite and its equipment. The probe satellite includes a flight control system that maintains the probe satellite in proximity to the satellite being monitored. In a preferred embodiment, the flight control system can also maintain the probe satellite in an orbit about the satellite being monitored, to facilitate diagnostics based on patterns of signals. The monitoring equipment in a preferred embodiment for a transponder satellite includes an ability to monitor incoming signals and to compare the emissions from the satellite to the incoming signals to determine performance characteristics, such as phase shift and gain.

BRIEF DESCRIPTION OF THE DRAWINGS

The invention is explained in further detail, and by way of example, with reference to the accompanying drawings wherein.

DETAILED DESCRIPTION OF THE INVENTION

Figure 1:
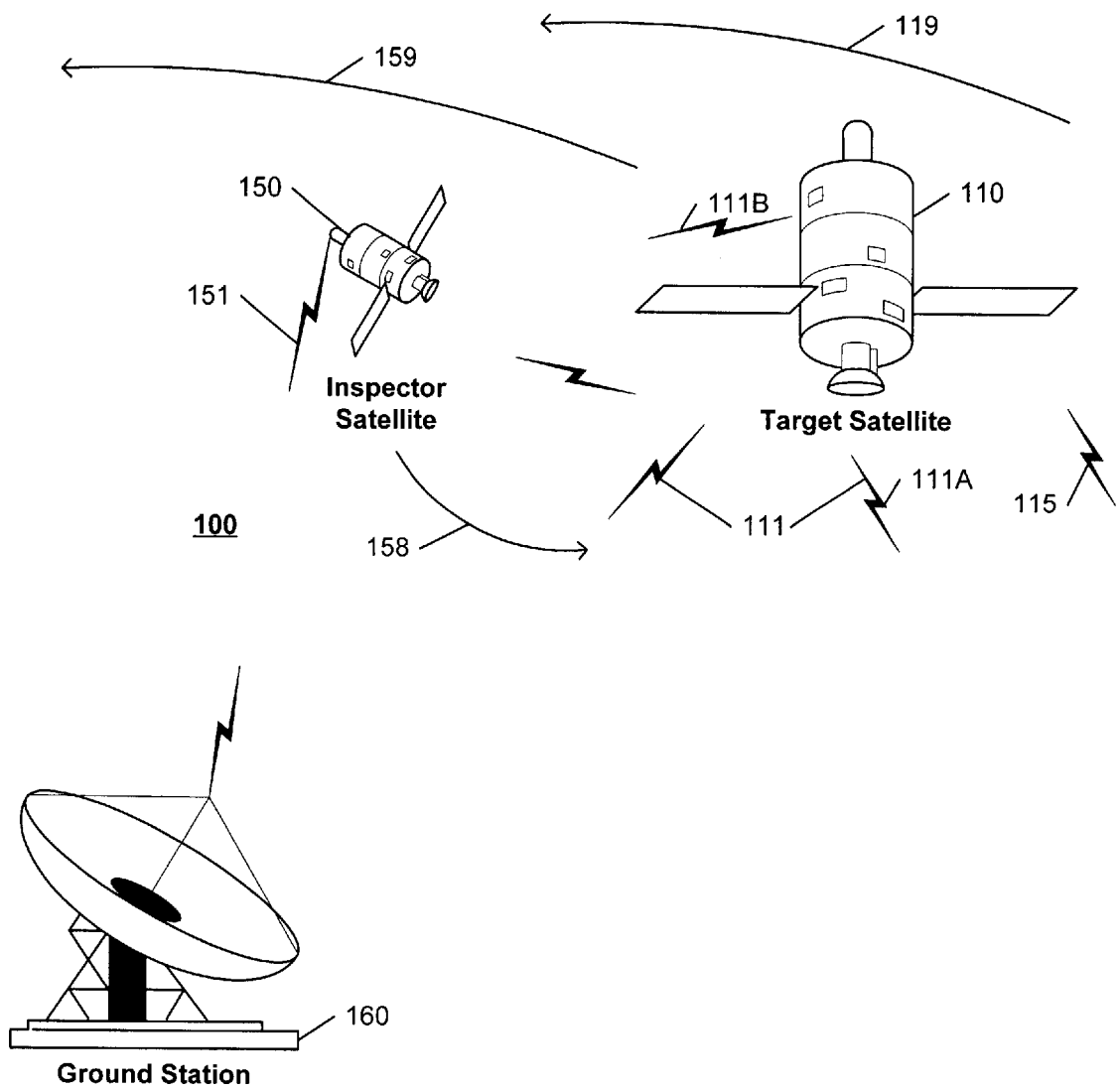
FIG. 1 illustrates an example satellite system for monitoring a target satellite in accordance with this invention.

FIG. 1 illustrates an example satellite system 100 for monitoring a target satellite 110 in accordance with this invention. The satellite system 100 includes an inspection satellite 150 and a ground station 160.

The target satellite 110 emits radio frequency (RF) signals 111 that comprise intended RF signals 111A as well as unintended radio RF signals 111B. The intended RF signals 111A are the mission specific transmissions from the satellite to the earth, to another satellite, or to distant known or unknown receivers beyond earth. Such transmissions 111A include, for example, retransmissions of signals 115 that are received from other transmitters (not shown), such as signals from portable telephones, signals from telephone relay systems on earth or on other satellites, signals from information collection systems, and so on. If the retransmission occurs via a filtering and amplification of the received signal at one frequency, and a transmission of the amplified signal at another frequency, the retransmission process is termed a transponding of the received signal. The intended transmissions 111A may also include a transmission of information derived from data collection systems on the target satellite 110, such as the results of an infrared scan of a select area, a scan for high energy discharges, video images from onboard cameras, and the like. The unintended RF transmissions 111B are signals that are emanated from operating electronic equipment on board the target satellite 110. Power systems on the target satellite 110 may use a switching system for voltage regulation; computer systems on the target satellite 110 operate with one or more clocking signals; communications within the target satellite 110 are effected via alternating signals on wires and cables between and among the components and subsystems within the target satellite 110; and so on. Each changing signal results in an electromagnetic radiation, some of which have a sufficient power in the radio frequency band to emanate beyond the target satellite 110, as unintended RF signals 111B.

Figure 2:
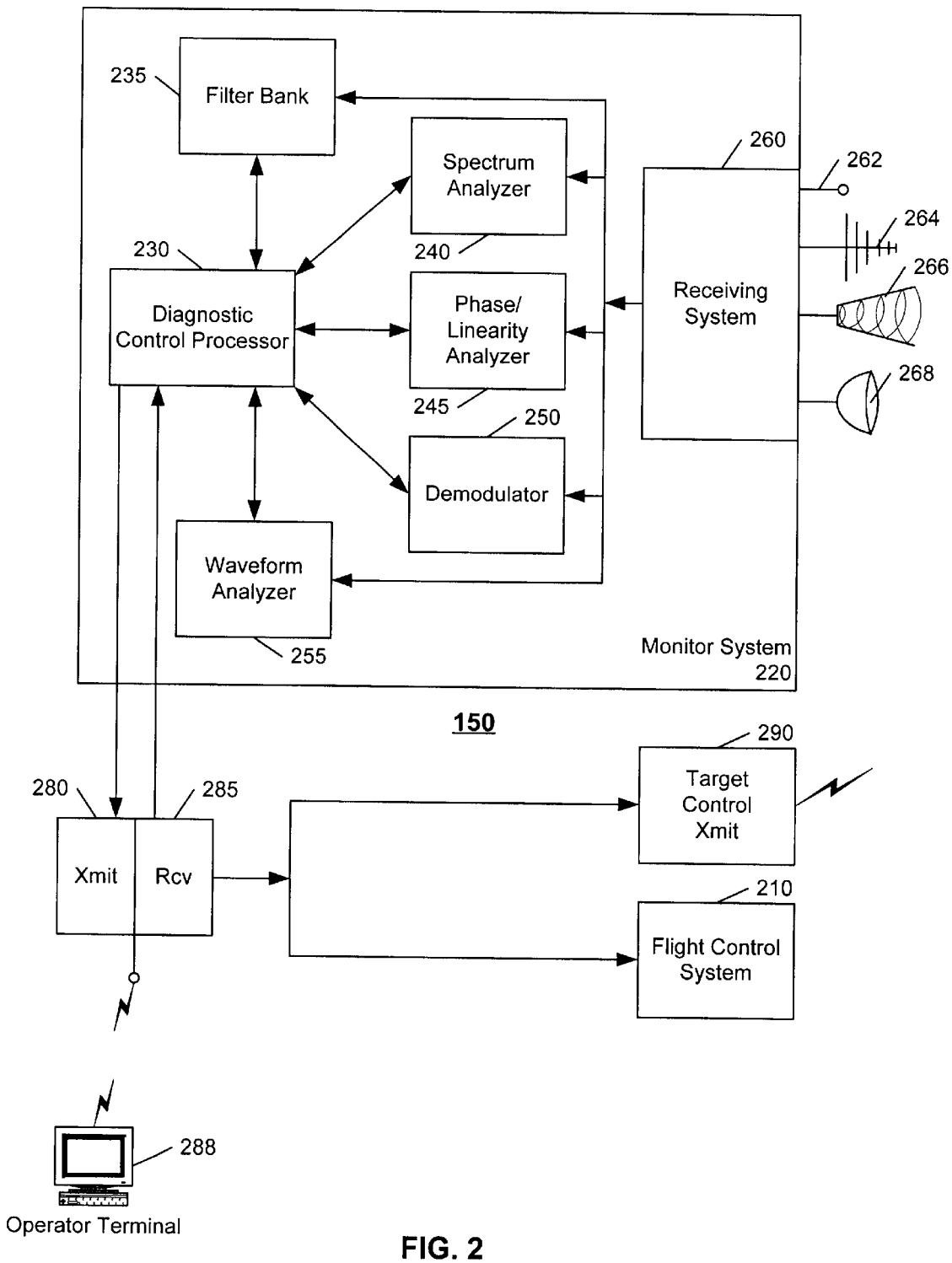
FIG. 2 illustrates an example block diagram of an inspection satellite in accordance with this invention.

The inspection satellite 150, in accordance with this invention, is configured to detect and process the RF emissions 111 from the target satellite 110 to facilitate a diagnosis of the target satellite 110 and its associated subsystems and components. As illustrated in FIG. 2, the inspection satellite 150 includes a flight control system 210, a monitoring system 220, and a transmitter 280 and receiver 285 for communicating with a remote operator terminal 288, typically located on the earth. The flight control system 210 maintains the inspection satellite 150 in proximity (typically, within one kilometer) of the target satellite 110. The target satellite 110 is illustrated in FIG. 1 as traveling in an orbit path 119. The flight control system 210 maintains the inspection satellite 150 in substantially the same orbit path, herein termed the major orbit 159 of the inspection satellite 150. As herein defined a substantially similar orbit path is an orbit having approximately the same period, with the satellites being in approximately the same phase of the period, for the duration required to collect the RF emissions. The flight control system 210 also controls the location of the inspection satellite 150 relative to the target satellite 110, as illustrated by the minor orbit path 158 of the inspection satellite 150, which may be regular or irregular perturbations to the major orbit path 129. The flight control system 210 may include ancillary equipment to aid the control task. For example, the inspection satellite 150 may include a camera that provides visual feedback for diagnosing physical damage; images from the camera may also be used by the flight control system 210 to determine distance from the target satellite. In like manner, sonar, infrared, and other ranging techniques may also be used. Note that, consistent with conventional terminology, maintaining a stationary location relative to a reference body is included herein in the definition of orbit, as is the navigation of any regular or irregular path relative to the reference body. For example, the flight control system 210 may maintain the inspection satellite 150 at a particular orientation angle from the target satellite 110 while varying the distance between them, to determine, for example, the characteristics of an emission as a function of distance. Likewise, the major orbit of the inspection satellite 150 may be more or less elliptical or inclined than the orbit of the target satellite 110, thereby allowing for the reception of emissions from the target satellite 110 at different distances and orientation angles.

The monitor system 220 includes receptors 262–268 for receiving emissions from the target satellite 110. As illustrated in FIG. 2, the example receptors 262–268 include an omnidirectional antenna, a log-periodic antenna 264, a spiral cone antenna 266, and a parabolic antenna 268; as would be evident to one of ordinary skill in the art, the choice and style of receptors 262–268 will be determined by the characteristics of the signals that are intended to be collected by the inspection satellite 150. The receiving system 260, under the control of the diagnostic control processor 230, selects one or more receptors 262–268 and provides the received emissions from the target satellite 110 to one or more monitor components 235–255.

In a preferred embodiment, the monitor system 220 of the inspection satellite 150 includes the diagnostic equipment that is used in a normal laboratory environment on earth during a satellite system performance test; in particular, the inspection satellite 150 includes the functional equivalent of the laboratory equipment used during system verification testing of the target satellite 110 prior to launch. Illustrated in FIG. 2, the example monitor equipment 235–255 include a filter bank 235, a spectrum analyzer 240, a phase and linearity analyzer 245, a demodulator 250, and a waveform analyzer 255; as would be evident to one of ordinary skill in the art, the choice and style of monitor equipment 235–255 will be determined by the characteristics of the signals that are intended to be collected, and the requirements of the diagnostic processes that are intended to be used. In a preferred embodiment, an operator at the operator terminal 288 is provided a user interface that resembles the monitor equipment as it would appear in an earth-based laboratory, and may conduct the same diagnostic tests as would be conducted, for example, in the anechoic chamber on earth for system performance testing. Also in a preferred embodiment, baseline tests of emissions from the target satellite 110 are conducted prior to launch. Subsequent emissions 111 collected by the inspection satellite 110 are compared regularly to those collected during the baseline tests, to detect trends or anomalies in the emission patterns. Additionally, in a preferred embodiment, automated diagnostics are conducted periodically for routine assessments and analyses. Note that by converting the received RF emissions into diagnostic information, the diagnostic information can be viewed and processed at the earth-based operator terminal 288 without subjecting the collected RF emissions from the target satellite 110 to the signal path loss of the satellite to earth distance. That is, the communicated diagnostic information 151 related to a very weak emission 111 will be communicated to the earth station with the same reliability as the diagnostic information 151 related to a very strong emission 111.

Of particular note is the use of the inspection satellite 150 to map the antenna pattern of the target satellite 110. A map of an antenna pattern is a two or three dimensional representation of the strength of the signal emitted from the antenna as a function of location relative to the antenna. In general it is created as an isogram of equal received power; an ideal omnidirectional antenna, for example, has a spherical antenna pattern, centered at the point of emission. An antenna's physical construction typically determines its designed pattern; a difference between an antenna's designed pattern and the map of the antenna pattern based on received emission is indicative, for example, of a defective antenna element, a leaking wave guide, failed RF transmission components, and so on.

Figure 3:
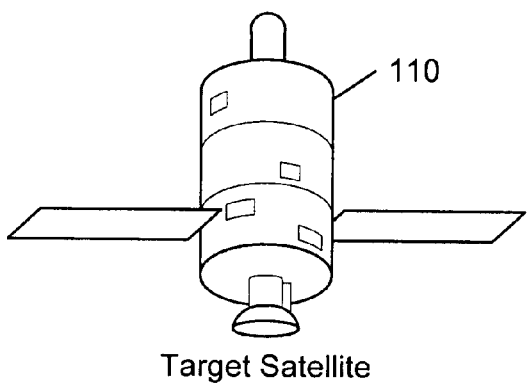
FIG. 3 illustrates an example emission collection and diagnosis task of an inspection satellite in accordance with this invention.
Figure 3:
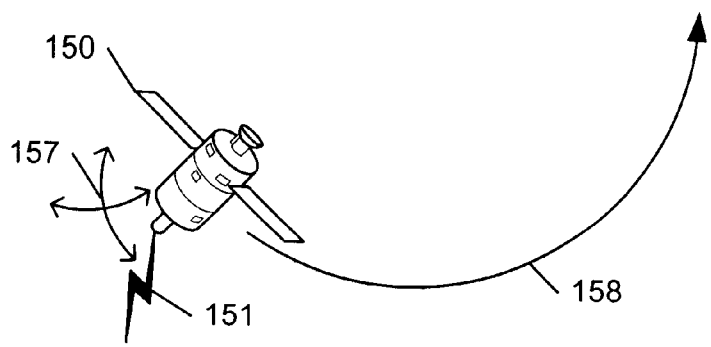
Figure 3:
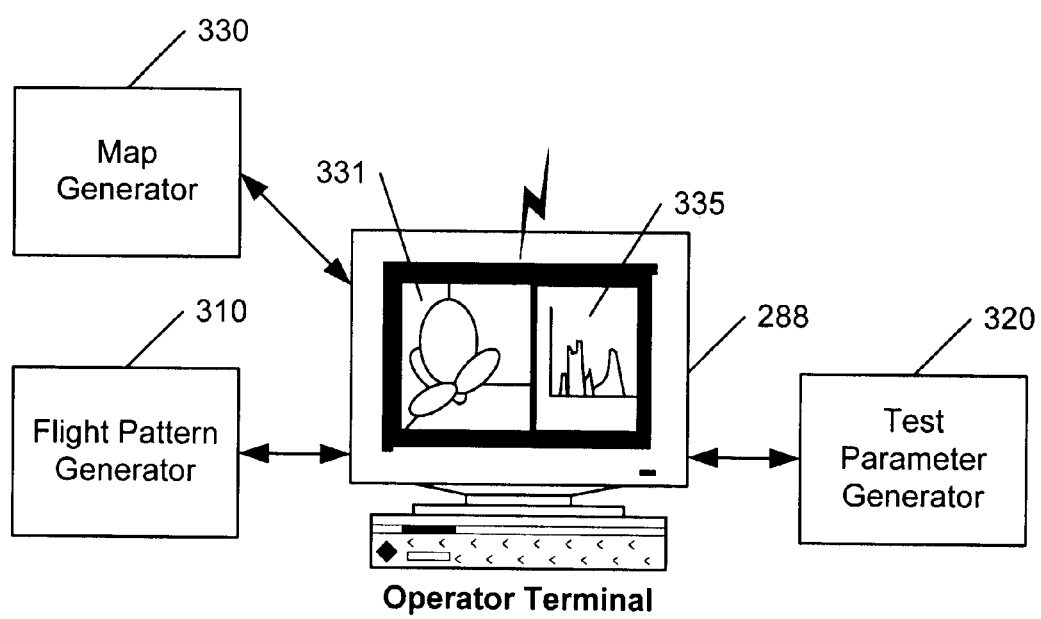

FIG. 3 illustrates an example use of the inspection satellite 150 to map the antenna pattern of the target satellite 110. To create the map, the inspection satellite 150 takes select measurements at different locations relative to the target satellite 110. An operator (not shown) selects a desired path for the inspection satellite 150, and defines the measurements to be taken along this path. The path and measurements may be selected from a predefined set of commonly performed mapping paths, or created specifically for a particular test or characterization. For example, a test parameter generator 320 generates the parameters required to effect a general mapping of the antenna pattern, including the settings for select monitor equipment, radio frequencies of interest, time or location intervals between measurements, path and orientation parameters, and so on. A flight pattern generator 310 provides the appropriate thrust and vector parameters to direct the flight control system 210 of the inspection satellite 150 to maintain the desired path 158 relative to the target satellite 110, and to maintain the inspection satellite 150 at a proper orientation 157 relative to the target satellite 110. As in a conventional mapping of an antenna pattern, the spectrum analyzer 240 measures the radiated power of the emissions 111 of the target satellite 110 as the location of the satellite changes, and communicates these measurements to the operator terminal 288 as diagnosis information 151. A map generator 330 processes the measurements taken at the multiple locations to provide an illustration 331 of the antenna pattern, for comparison with the antenna's designed pattern, or with maps of the antenna pattern created from prior diagnosis information 151. As in conventional diagnosis and analysis systems, the map generator 330 applies interpolation and other data smoothing techniques to provide visually meaningful illustrations 331. Also as in conventional diagnosis systems, the diagnosis information 151 from the individual monitor equipment is displayed at the operator terminal 288, as illustrated by an example spectrograph output 335 of the spectrum analyzer 240 in FIG. 3.

In a preferred embodiment, the monitor system 220 also includes demodulation equipment 250 to facilitate a diagnosis of the information signals that are contained "within" the received RF emissions. For example, the target satellite 110 may be a transmitter for High Definition Television (HDTV) programs that are digitally encoded video signals having specific characteristics, such as specified phase relationships between signal transitions. The demodulator 250 in this example separates a program from the multiple programs being transmitted by the target satellite 110. The diagnostic control processor 230 directs this demodulated waveform to the spectrum analyzer 240, phase and linearity analyzer 245, the waveform analyzer 255, or the ground station 160, as appropriate, to assess the relevant characteristic for anomalies or inconsistencies with regard, for example, to the specified characteristics for HDTV programs. The filter bank 235 is used in a preferred embodiment to allow for the selection of specific frequencies of interest, at the received RF frequencies or at the demodulated baseband frequencies.

The inspection satellite 150 is also used, as mentioned above, to facilitate a diagnosis of the target satellite 110 based on unintended emissions 111B. Unintended emissions 111B include emissions from devices other than antennas, as well as emissions from directional antennas outside their designed fields of view. That is, a directional antenna is an intended emitter of signals in a particular range of directions from the antenna, and an unintended emitter of signals in other directions. The aforementioned mapping of an antenna pattern may include the mapping of all areas surrounding the antenna, but the mapping process is a time and energy consuming process. In lieu of a detailed mapping, a general monitoring of emissions in the frequency range of the intended emissions of the target satellite 110, but in regions known to be out of range of the satellite 150 antenna's design field of view, can provide an indication that antenna leakage is occurring, from which additional diagnostics, such as a mapping of the antenna pattern may be pursued.

The other unintended emissions 111B from the target satellite 110 can be utilized to diagnose equipment within the target satellite 110. In the general case, a set of spectral characteristics of the unintended emissions 111B from the satellite 110 under normal operating conditions can be created, for example, during the system tests before launch, for reference purposes. Using techniques commonly used for EMI analysis of electronic systems, the significant features of the spectral characteristics, herein termed EMI signatures, can be associated with individual components or subsystems within the satellite 110. Subsequent collected spectral characteristics of the unintended emissions 111B when the target satellite 110 is in operation in orbit can facilitate the diagnosis of subsystem or component problems by comparing the collected spectral characteristics with the reference spectral characteristics to identify missing or abnormal EMI signatures. At a more detailed level, EMI signatures can be associated with individual signals, such as a master clock signal, a power supply switching signal, and others. The presence of an appropriate level EMI signature will imply the proper operation of the equipment that generates the signal, and will facilitate the diagnosis of equipment that uses the signal. Conversely, an inappropriate level, or missing, EMI signature will imply a problem with the equipment that generates the signal, or the equipment or subsystem that immediately loads the signal. Note that, as with the other diagnostic techniques discussed above, the inspection satellite 150 in accordance with this invention allows for a degree of accuracy, precision, resolution, and repeatability that cannot be achieved by an earth-based system.

In a preferred embodiment of this invention, the target satellite 110 can be configured to participate in the aforementioned diagnosis processes. For example, a particular test pattern may be executed by the target satellite 110 upon receipt of a corresponding diagnostic command, thereby providing a repeatable set of emissions to facilitate time or location based comparisons. The diagnostic command may be transmitted from a ground station, or, as in the illustration of FIG. 2, from a target control transmitter 290 in the inspection satellite 150. In a preferred embodiment, the target control transmitter 290 also performs the function of an RF probe by communicating test stimuli to the target satellite 110 as required, to facilitate a diagnosis of the reception capabilities of the target satellite 110, or to facilitate a diagnosis of the transponding equipment of the target satellite 110. By generating and transmitting a signal of known characteristics as an incoming signal to a transponding satellite 110, the receipt of the corresponding transponded output signals from the satellite 110 allows for accurate and precise phase, linearity, dynamic range, and other comparative assessments via the analyzers 245 and 255. In an alternative embodiment, the receiving system 260 receives the same incoming signals that are being received by the target satellite 110 and performs the comparative assessments based on these incoming signals, rather than internally generated RF signal from the transmitter 290.

The foregoing merely illustrates the principles of the invention. It will thus be appreciated that those skilled in the art will be able to devise various arrangements which, although not explicitly described or shown herein, embody the principles of the invention and are thus within its spirit and scope. For example, the aforementioned diagnoses based on EMI signatures assumed an a priori association of EMI signatures to specific signals, equipment, or subsystems. If the a priori association of EMI signatures has not occurred, or a new EMI signature is discovered, diagnostic techniques can be employed to identify the most likely signal, equipment, or subsystem to have formed the new EMI signature. In like manner, other techniques for associating a measured characteristic to a particular signal, equipment, or subsystem are known in the art. The embodiments presented herein are presented for illustration purposes. For example, the embodiments discussed herein assume the presence of an operator to perform the diagnosis.

The operator is presented as being associated with the ground station 160 that controls the inspection satellite 150, although the diagnosis operator could be an independent entity. In like manner, the operator terminal 288 need not be earth bound, and could reside, for example, at a space station. Also, the communication from the inspector satellite 150 to the operator terminal 288 may be indirect, via, for example, other satellites, including the target satellite 110, and via conventional store and forward communication techniques. As would be evident to one of ordinary skill in the art, the use of automated diagnosis systems may obviate the need for an operator. In such a system as well, the automated diagnosis system may reside in the inspection satellite 150, obviating the need for communicating the diagnostic information. These and other system and architecture alternatives will be evident to one of ordinary skill in the art in light of this invention, and included within the intended scope of the following claims.

We claim:

1. An inspection satellite comprising:
   a flight control system that is configured to maintain the inspection satellite in proximity to a target satellite, and
   a monitoring system that is configured to receive radio frequency emissions from the target satellite and produce therefrom diagnostic information of the target satellite based on the radio frequency emissions.

2. The inspection satellite of claim 1, wherein
   the flight control system is configured to maintain the inspection satellite in proximity to the target satellite by maintaining the inspection satellite:
   in a major orbit that is substantially the same as a target satellite orbit associated with the target satellite, and also
   in a minor orbit about the target satellite.

3. The inspection satellite of claim 1, further including
   a transmitter that is configured to transmit diagnostic information to an earth station, based on the radio frequency emissions received from the target satellite.

4. The inspection satellite of claim 1, wherein
   the monitoring system includes at least one of: a spectrum analyzer, a radio frequency filter, a demodulator, and a radio frequency probe.

5. The inspection satellite of claim 4, wherein:
   the monitoring system is configured to provide diagnostic information, and
   the inspection satellite further includes
      a transmitter that is configured to transmit the diagnostic information to an earth station.

6. The inspection satellite of claim 5, wherein
   the flight control system is configured to maintain the inspection satellite in proximity to the target satellite by maintaining the inspection satellite:
   in a major orbit that is substantially the same as a target satellite orbit associated with the target satellite, and also
   in a minor orbit about the target satellite.

7. The inspection satellite of claim 1, wherein:
   the flight control system is further configured to place the inspection satellite at select positions relative to at least one antenna of the target satellite, and
   the monitoring system is configured to receive the radio frequency emissions from the at least one antenna at each of the select positions to facilitate a mapping of a pattern of the radio frequency emissions.

8. The inspection satellite of claim 1, wherein
   the monitoring system is further configured
      to receive incoming signals and
      to provide diagnostic information based on a comparison of the incoming signals and radio frequency emissions from the target satellite corresponding to a transponding of the incoming signals.

9. The inspection satellite of claim 8, wherein
   the diagnostic information is configured to facilitate the diagnosis of at least one of: a phase characteristic, a power characteristic, a linearity characteristic, a spectral characteristic, and a dynamic range characteristic.

10. The inspection satellite of claim 8, further including:
    a target control transmitter that is configured to transmit the incoming signals to the target satellite.

11. The inspection satellite of claim 1, further including:
    a transmitter that is configured to communicate diagnostic commands to the target satellite to affect the radio frequency emissions from the target satellite.

12. The inspection satellite of claim 1, wherein
    the monitoring system is configured
       to receive the radio frequency emissions corresponding to at least one subsystem of the target satellite and
       to provide the diagnostic information corresponding to an emission pattern of the at least one subsystem.

13. A satellite system comprising:
    an inspection satellite that is configured to maintain a major orbit that corresponds to a primary orbit of a target satellite,
    the inspection satellite comprising a monitoring system that is configured to receive radio frequency emissions from the target satellite and to produce therefrom diagnostic information, and
    an earth station that is configured to receive the diagnostic information from the inspection satellite to facilitate a diagnosis of the target satellite.

14. The satellite system of claim 13, wherein the inspection satellite further includes
    a flight control system that:
       is configured to maintain the inspection satellite in the major orbit, and
       is further configured to maintain the inspection satellite in a minor orbit about the target satellite.

15. The satellite system of claim 14, further including:
    a test parameter generator that is configured to determine a set of monitor parameters and a set of location parameters, and
    a flight pattern generator, operably coupled to the test parameter generator, that is configured to determine a set of flight commands based on the set of location parameters;
    wherein:
    the flight control system is further configured to maintain the inspection satellite at relative locations to the target satellite in dependence upon the set of flight commands from the flight pattern generator, and
    the monitoring system is configured to produce the diagnostic information in dependence upon the set of monitor parameters.

16. The satellite system of claim 15, further including:
    a mapping system that is configured to receive the diagnostic information corresponding to the relative locations and to produce therefrom an antenna radiation pattern corresponding to at lease one antenna of the target satellite.

17. The satellite system of claim 13, wherein the monitoring system includes at least one of: a spectrum analyzer, a waveform analyzer, an radio frequency filter, a demodulator, and an radio frequency probe.

18. The satellite system of claim 13, wherein the diagnosis information is configured to include spectral characteristics of the radio frequency emissions, to facilitate a diagnosis of at least one of: a defective antenna element, a wave guide leakage, and a failed radio frequency component.

19. The satellite system of claim 13, wherein the diagnosis information includes an identification of characteristics of unintended radio frequency emissions from the target satellite, to facilitate a diagnosis of at least one of: a power system, a clock system, and a processing system associated with the target satellite.

20. The satellite system of claim 13, further including:

a transmitter that is configured to communicate diagnostic commands to the target satellite to affect the radio frequency emissions from the target satellite.

21. A method for diagnosing a target satellite, comprising:

placing an inspection satellite in proximity to the target satellite, receiving emissions at the inspection satellite from the target satellite, processing the emissions at the inspection satellite to produce diagnostic information, and communicating the diagnostic information to a ground station.

22. The method of claim 21, further including:

placing the inspection satellite in orbit about the target satellite.

23. The method of claim 21, wherein:

the target satellite has a target satellite orbit, and placing the inspection satellite in proximity to the target satellite includes placing the inspection satellite in a major orbit that is substantially the same as the target satellite orbit.

24. The method of claim 21, wherein:

the target satellite provides the emissions in response to incoming signals, and processing the emissions includes comparing the emissions to the incoming signals.

25. The method of claim 21, further comprising communicating a diagnostic command the target satellite to effect a change in the emissions from the target satellite.

* * * * *

UNITED STATES PATENT AND TRADEMARK OFFICE
CERTIFICATE OF CORRECTION

| | | |
|---|---|---|
| PATENT NO. | : 6,296,205 B1 | Page 1 of 1 |
| APPLICATION NO. | : 09/267942 | |
| DATED | : October 2, 2001 | |
| INVENTOR(S) | : Hanson et al. | |

It is certified that error appears in the above-identified patent and that said Letters Patent is hereby corrected as shown below:

Col. 1, line 9, ADD the following statement to the referenced patent:

This invention was made with U.S. Government support under Contract No. F29601-03-C-0081 awarded by the U.S. Air Force. The U.S. Government has certain rights in the invention.

Signed and Sealed this
Twenty-ninth Day of November, 2011

David J. Kappos
*Director of the United States Patent and Trademark Office*